United States Patent
Neff et al.

(10) Patent No.: US 12,136,166 B2
(45) Date of Patent: Nov. 5, 2024

(54) MESHLET SHADING ATLAS

(71) Applicant: QUALCOMM Technologies, Inc., San Diego, CA (US)

(72) Inventors: Thomas Neff, Graz (AT); Jörg Hermann Müller, Graz (AT); Markus Steinberger, Graz (AT); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 17/934,159

(22) Filed: Sep. 21, 2022

(65) Prior Publication Data

US 2023/0101978 A1    Mar. 30, 2023

Related U.S. Application Data

(60) Provisional application No. 63/261,909, filed on Sep. 30, 2021.

(51) Int. Cl.
  *G06T 15/80*   (2011.01)
  *G06T 17/10*   (2006.01)
  *G06T 17/20*   (2006.01)

(52) U.S. Cl.
  CPC ............... *G06T 15/80* (2013.01); *G06T 17/10* (2013.01); *G06T 17/205* (2013.01)

(58) Field of Classification Search
  CPC .......... G06T 15/80; G06T 15/00; G06T 9/00; G06T 9/40; G06T 17/00; G06T 17/005; G06T 17/10; G06T 17/20; G06T 17/205; G06T 2219/2008; G06T 15/04; G06T 15/40; G06T 19/20
  See application file for complete search history.

(56) References Cited

U.S. PATENT DOCUMENTS

| | | |
|---|---|---|
| 6,286,104 B1 | 9/2001 | Buhle et al. |
| 10,417,787 B2* | 9/2019 | Nevraev ............... G06T 15/80 |
| 10,991,127 B2* | 4/2021 | Nevraev ............... G06T 15/80 |
| 2005/0091579 A1 | 4/2005 | Mewherter et al. |

(Continued)

OTHER PUBLICATIONS

International Search Report and Written Opinion—PCT/US2022/044445—ISA/EPO—Jan. 27, 2023.

(Continued)

*Primary Examiner* — Vijay Shankar

(74) *Attorney, Agent, or Firm* — QUALCOMM Incorporated

(57) ABSTRACT

Aspects presented herein relate to methods and devices for graphics processing including an apparatus, e.g., a GPU. The apparatus may divide at least one scene into a plurality of meshlets, each of the meshlets including a plurality of primitives, and each of the primitives including plurality of vertices. The apparatus may also calculate a pair of texture coordinates for each of the plurality of vertices. Further, the apparatus may select a size of each of the plurality of meshlets in the at least one scene based on the pair of the texture coordinates and based on a perspective projection of each of the plurality of meshlets. The apparatus may also calculate layout information in a meshlet atlas for each of the meshlets in the at least one scene. Moreover, the apparatus may shade each of a plurality of pixels in the meshlet atlas based on the calculated layout information.

26 Claims, 9 Drawing Sheets

(56) References Cited

U.S. PATENT DOCUMENTS

2018/0232912 A1* 8/2018 Nevraev ................. G06T 15/80
2020/0051286 A1* 2/2020 Nevraev ............... G06T 17/205

OTHER PUBLICATIONS

Kubisch C., "Introduction to Turing Mesh Shaders | NVIDIA Developer Blog", Sep. 17, 2018, XP055695710, 18 pages, section "Introduction to Turing Mesh Shaders" section "Motivation" section "Mesh Shading Pipeline", the whole document.
Mueller J.H., et al., "Shading Atlas Streaming", ACM Transactions on Graphics, ACM, NY, US, vol. 37, No. 6, Dec. 4, 2018, pp. 1-16, XP058686879, ISSN: 0730-0301, Section 3 System Overview, Section 4 Shading Atlas.
Neff T., et al., "Meshlets and How to Shade Them: A Study on Texture-Space Shading", Computer Graphics Forum : Journal of the European Association for Computer Graphics, May 24, 2022, pp. 277-287, XP093013576, Oxford ISSN: 0167-7055, the whole document.

* cited by examiner

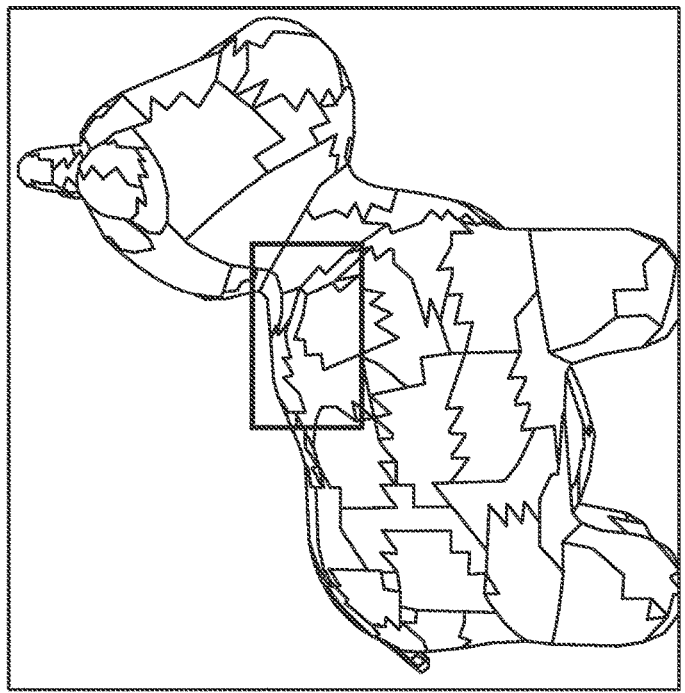
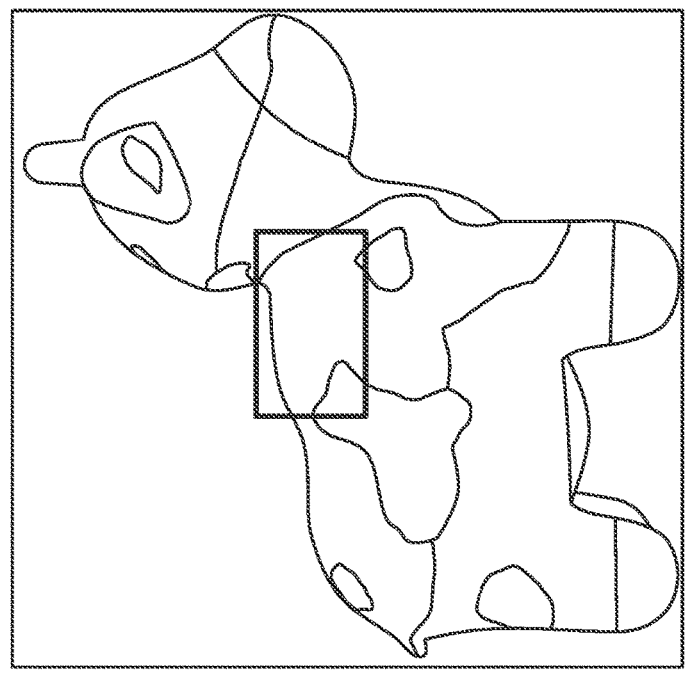
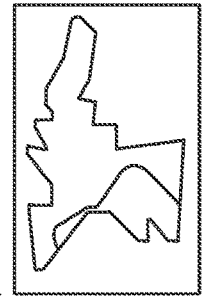
FIG. 4A
FIG. 4B
FIG. 4C

MESHLET SHADING ATLAS

CROSS REFERENCE TO RELATED APPLICATION(S)

This application claims the benefit of and priority to U.S. Provisional Application Ser. No. 63/261,909, entitled "MESHLET SHADING ATLAS" and filed on Sep. 30, 2021, which is expressly incorporated by reference herein in its entirety.

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that may perform graphics processing. The apparatus may divide at least one scene into a plurality of meshlets, each of the plurality of meshlets including a plurality of primitives, and each of the plurality of primitives including plurality of vertices. The apparatus may also identify a visibility of each of the plurality of meshlets in the at least one scene, where each of the plurality of meshlets is identified as visible or invisible. Additionally, the apparatus may discard each of the plurality of meshlets that are identified as invisible. The apparatus may also calculate a pair of texture coordinates for each of the plurality of vertices of each of the plurality of primitives in each of the plurality of meshlets. The apparatus may also select a size of each of the plurality of meshlets in the at least one scene based on the pair of the texture coordinates for each the plurality of vertices of each of the plurality of primitives in each of the plurality of meshlets and based on a perspective projection of each of the plurality of meshlets. Moreover, the apparatus may calculate layout information in a meshlet atlas for each of the plurality of meshlets in the at least one scene, the layout information in the meshlet atlas for each meshlet being based on the selected size of the meshlet. The apparatus may also shade each of a plurality of pixels in the meshlet atlas based on the calculated layout information in the meshlet atlas. The apparatus may also render each of the plurality of meshlets that are identified as visible, where the meshlet atlas is sampled to determine a color of each of the plurality of pixels in an output image. Further, the apparatus may transmit, to a display or a panel, the output image including the rendered plurality of meshlets that are identified as visible.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating an example three-dimensional (3D) model.

FIG. 4B is a diagram illustrating an example visualization model.

FIG. 4C is a diagram illustrating an example meshlet.

DETAILED DESCRIPTION

Figure 1:
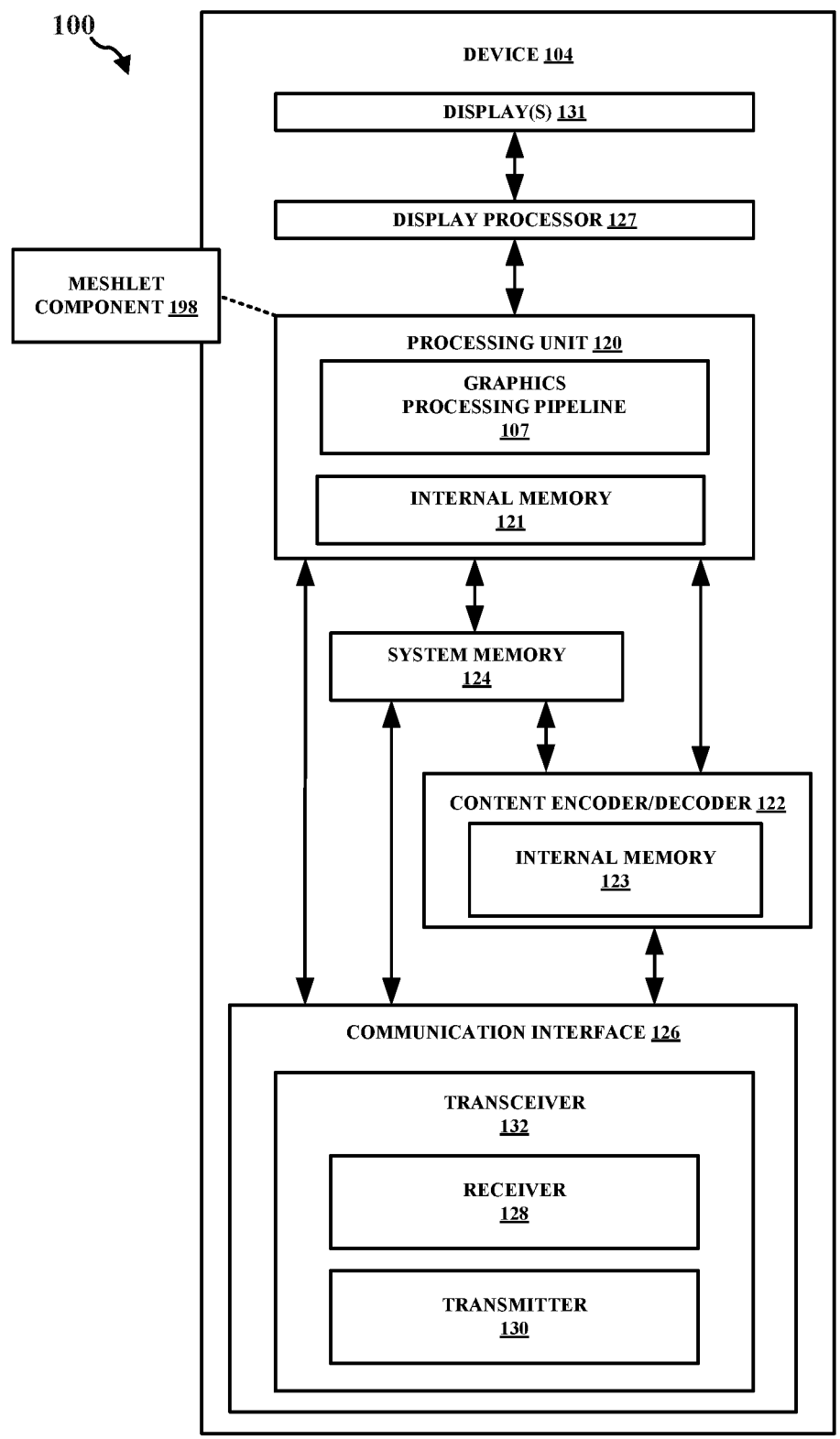
FIG. 1 is a block diagram that illustrates an example content generation system in accordance with one or more techniques of this disclosure.

Some aspects of graphics processing may utilize different types of shading processes, e.g., object space shading or texel shading. Object space shading may store shading results in an object space, rather than in a final image space as in other types of shading. The object space may be a texture space of models, such as in texel shading. In shading atlas streaming, the object space is the atlas where patches of models are shaded within blocks, e.g., rectangular blocks. In some aspects of graphics processing, different object space shading methods may group a shading workload differently, such as in different types of shading units. This may improve the efficiency of shading, as well as enable streaming of the shading information and/or reuse of the shading information. Some aspects of texel shading may use pixel tiles (e.g., 8×8 pixel tiles) in the original texture space of each texture. Further, shading atlas streaming may use patches (e.g., up to 3 primitives/triangles) that are mapped into rectangular blocks. In contrast, screen-space methods may operate on a per-pixel level (or in screen-space tiles), which may need to be recomputed approximately every frame. Accordingly, screen-space methods may be difficult to reuse and/or stream with an adequate temporal coherence. Object space shading methods may also result in the object space sampling pattern not matching well with a target screen-space sampling pattern. This inability to match with the target screen-space sampling pattern may result in oversampling, which wastes GPU performance (e.g., waste up to 400% of pixels that are processed). Further, the inability to match with the target screen-space sampling pattern may result in undersampling, which causes a decreased image quality. In some instances, distorted primitives/triangles in a shading atlas may suffer from undersampling in one axis while oversampling in the other axis due to a rectangular mapping into blocks. Aspects of the present disclosure may provide shading methods, e.g., object space shading methods, including a sampling pattern that matches a target screen-space sampling pattern. For instance, aspects of the present disclosure may include large shading units, e.g., in texture space, with a mapping that is mostly view-independent and distortion-free for all possible views. Aspects of the present disclosure may also provide shading units that are large enough and roughly align with their screen-space size. By doing so, aspects of the present disclosure may minimize the effects of oversampling and undersampling.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a meshlet component 198 configured to divide at least one scene into a plurality of meshlets, each of the plurality of meshlets including a plurality of primitives, and each of the plurality of primitives including plurality of vertices. The meshlet component 198 may also be configured to identify a visibility of each of the plurality of meshlets in the at least one scene, where each of the plurality of meshlets is identified as visible or invisible. The meshlet component 198 may also be configured to discard each of the plurality of meshlets that are identified as invisible. The meshlet component 198 may also be configured to calculate a pair of texture coordinates for each of the plurality of vertices of each of the plurality of primitives in each of the plurality of meshlets. The meshlet component 198 may also be configured to select a size of each of the plurality of meshlets in the at least one scene based on the pair of the texture coordinates for each the plurality of vertices of each of the plurality of primitives in each of the plurality of meshlets and based on a perspective projection of each of the plurality of meshlets. The meshlet component 198 may also be configured to calculate layout information in a meshlet atlas for each of the plurality of meshlets in the at least one scene, the layout information in the meshlet atlas for each meshlet being based on the selected size of the meshlet. The meshlet component 198 may also be configured to shade each of a plurality of pixels in the meshlet atlas based on the calculated layout information in the meshlet atlas. The meshlet component 198 may also be configured to render each of the plurality of meshlets that are identified as visible, where the meshlet atlas is sampled to determine a color of each of the plurality of pixels in an output image. The meshlet component 198 may also be configured to transmit, to a display or a panel, the output image including the rendered plurality of meshlets that are identified as visible. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
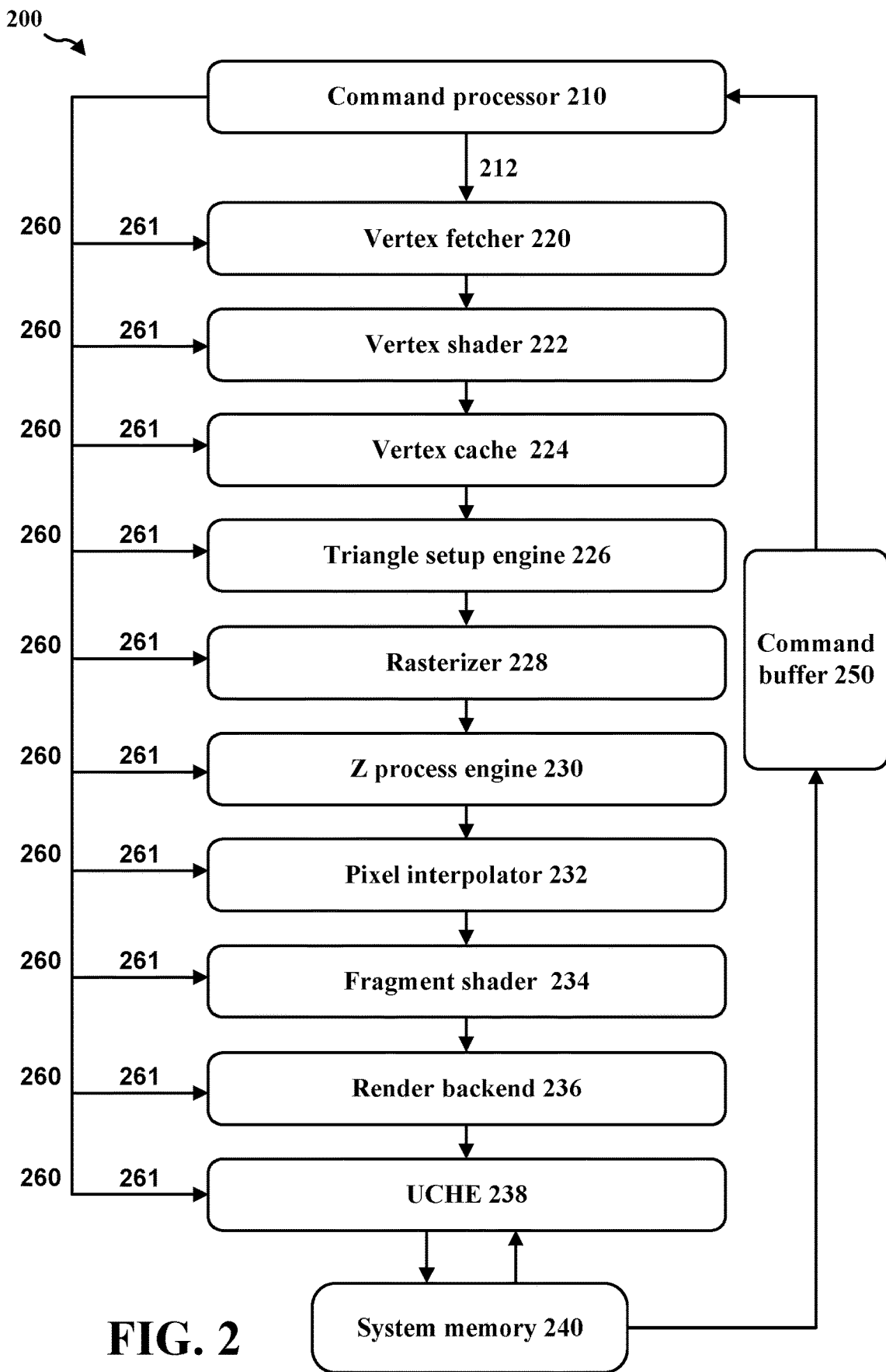
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In some aspects, GPUs may apply the drawing or rendering process to different bins or tiles. For instance, a GPU may render to one bin, and perform all of the draws for the primitives or pixels in the bin. During the process of rendering to a bin, the render targets may be located in the GMEM. In some instances, after rendering to one bin, the content of the render targets may be moved to a system memory and the GMEM may be freed for rendering the next bin. Additionally, a GPU may render to another bin, and perform the draws for the primitives or pixels in that bin. Therefore, in some aspects, there might be a small number of bins, e.g., four bins, that cover all of the draws in one surface. Further, GPUs may cycle through all of the draws in one bin, but perform the draws for the draw calls that are visible, i.e., draw calls that include visible geometry. In some aspects, a visibility stream may be generated, e.g., in a binning pass, to determine the visibility information of each primitive in an image or scene. For instance, this visibility stream may identify whether a certain primitive is visible or not. In some aspects, this information may be used to remove primitives that are not visible, e.g., in the rendering pass. Also, at least some of the primitives that are identified as visible may be rendered in the rendering pass.

In some aspects of tiled rendering, there may be multiple processing phases or passes. For instance, the rendering may be performed in two passes, e.g., a visibility or bin-visibility pass and a rendering or bin-rendering pass. During a visibility pass, a GPU may input a rendering workload, record the positions of the primitives or triangles, and then determine which primitives or triangles fall into which bin or area. In some aspects of a visibility pass, GPUs may also identify or mark the visibility of each primitive or triangle in a visibility stream. During a rendering pass, a GPU may input the visibility stream and process one bin or area at a time. In some aspects, the visibility stream may be analyzed to determine which primitives, or vertices of primitives, are visible or not visible. As such, the primitives, or vertices of primitives, that are visible may be processed. By doing so, GPUs may reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information may be used to determine or generate a visibility stream. In a rendering pass, the primitives in each bin may be rendered separately. In these instances, the visibility stream may be fetched from memory used to drop primitives which are not visible for that bin.

Some aspects of GPUs or GPU architectures may provide a number of different options for rendering, e.g., software rendering and hardware rendering. In software rendering, a driver or CPU may replicate an entire frame geometry by processing each view one time. Additionally, some different states may be changed depending on the view. As such, in software rendering, the software may replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware may manage the replication or processing of the primitives or triangles for each viewpoint in an image.

In some aspects, rendering may be performed in multiple locations and/or on multiple devices, e.g., in order to divide the rendering workload between different devices. For example, the rendering may be split between a server and a client device, which may be referred to as "split rendering." In some instances, split rendering may be a method for bringing content to user devices or head mounted displays (HMDs), where a portion of the graphics processing may be performed outside of the device or HMD, e.g., at a server.

Split rendering may be performed for a number of different types of applications, e.g., virtual reality (VR) applications, augmented reality (AR) applications, and/or extended reality (XR) applications. In VR applications, the content displayed at the user device may correspond to man-made or animated content. In AR or XR content, a portion of the content displayed at the user device may correspond to real-world content, e.g., objects in the real world, and a portion of the content may be man-made or animated content. Also, the man-made or animated content and real-world content may be displayed in an optical see-through or a video see-through device, such that the user may view real-world objects and man-made or animated content simultaneously. In some aspects, man-made or animated content may be referred to as augmented content, or vice versa.

Figure 3:
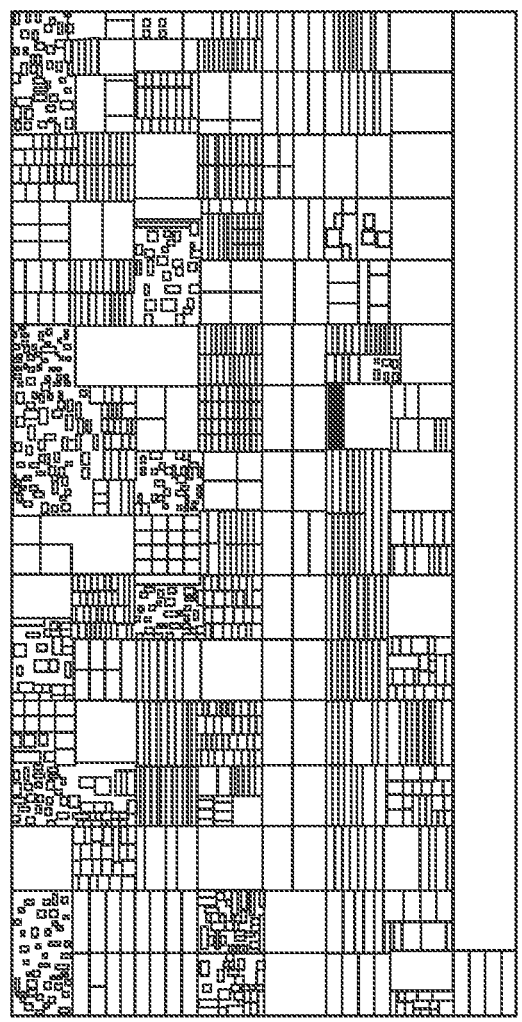
FIG. 3 is a diagram illustrating an example shading atlas.

FIG. 3 illustrates one example of a shading atlas 300 as utilized in graphics processing. As shown in FIG. 3, some aspects of graphics processing may utilize shading atlas streaming, such as via shading atlas 300. Shading atlas streaming is an object-space rendering framework suitable for streaming virtual reality (VR) content. In some instances, shading atlas streaming may also be referred to as vector streaming. Shading atlas streaming may dynamically chart patches of primitives into a texture atlas. Shading atlas streaming may also patch a number of primitives or triangles (e.g., one (1) to three (3) primitives or triangles) assigned to a rectangle in an atlas.

Some aspects of graphics processing may also determine a visibility for patches of two or three adjacent primitives/triangles. Atlas memory management may be directly derived from a potentially visible set (PVS) of current and predicted viewpoints (i.e., using an extended field of view (FOV)). This process of atlas memory management may be performed dynamically on a graphics processing unit (GPU). Newly visible patches may be allocated in the atlas, while patches that have become invisible may be removed from the atlas. Moreover, patch sizes may be determined based on a projected area of the patch on the screen. In the shading stage, visible patches may be shaded into the atlas using a standard geometry pass.

In split rendering applications (e.g., applications including a server and a client device), the server may compute shading information in a shading atlas, e.g., shading atlas 300. The shading atlas may be encoded (e.g., moving picture experts group (MPEG) encoded) and streamed to a client device (e.g., a standalone head mounted display (HMD)). The shading atlas may be temporally coherent and lend itself to efficient MPEG compression and streaming. The client device may render final views at a higher frame rate. Additionally, shading may be sampled from a shading atlas. As a user moves their head, new views may be rendered. These new views may use a newest atlas frame available at the client device.

Some aspects of graphics processing may utilize different types of shading processes (e.g., object space shading or texel shading). Object space shading may store shading results in an object space, rather than in a final image space as in other types of shading. The object space may be a texture space of models, such as in texel shading. In shading atlas streaming, the object space is the atlas where patches of models are shaded within blocks (e.g., rectangular blocks). For example, shading atlas 300 in FIG. 3 may be an object space where patches of models are shaded within blocks.

In some aspects of graphics processing, different object space shading methods may group a shading workload differently. This may improve the efficiency of shading, as well as enable streaming of the shading information and/or reuse of the shading information. Some aspects of texel shading may group shading workloads by using pixel tiles (e.g., 8×8 pixel tiles) in the original texture space of each texture. Further, shading atlas streaming may group shading workloads by using patches (e.g., groups of up to 3 primitives/triangles) that are mapped into rectangular blocks. In contrast, screen-space methods may operate on a per-pixel level (or in screen-space tiles), which may need to be recomputed approximately every frame. Accordingly, screen-space methods may be difficult to reuse and/or stream with an adequate temporal coherence.

Object space shading methods may also result in the object space sampling pattern not matching well with a target screen-space sampling pattern. This inability to match with the target screen-space sampling pattern may result in oversampling, which wastes GPU performance. Further, the inability to match with the target screen-space sampling pattern may result in undersampling, which causes a decreased image quality. In some instances, distorted primitives/triangles in a shading atlas may suffer from undersampling in one axis while oversampling in the other axis due to a rectangular mapping into blocks. Based on the above, it may be beneficial to provide a shading method including a sampling pattern that matches a target screen-space sampling pattern. It may also be beneficial to identify large areas that can be shaded continuously (e.g., in texture space) with a mapping that is mostly view-independent and distortion-free for all possible views. Moreover, it may be beneficial to include the shading units that are large enough and roughly align with their screen-space size.

Aspects of the present disclosure may provide shading methods (e.g., object space shading methods) including a sampling pattern that matches a target screen-space sampling pattern. For instance, aspects of the present disclosure may include large shading units (e.g., in texture space) with a mapping that is mostly view-independent and distortion-free for all possible views. Aspects of the present disclosure may also provide shading units that are large enough and roughly align with their screen-space size. By doing so, aspects of the present disclosure may minimize the effects of oversampling and undersampling.

In some aspects, shading atlas streaming may rely on object space shading and may use patches (e.g., up to 3 primitives or triangles) that are mapped into rectangular blocks as a unit building block. Object-space shading methods may suffer from the fact that their sampling pattern does not match well with target screen-space sampling pattern, which may lead to over-sampling and under-sampling. Aspects presented herein propose object space shading methods to address this issue, including a sampling pattern that matches a target screen-space sampling pattern. For instance, aspects presented herein may utilize shading units with a mapping that is view-independent and distortion-free for a number of views (e.g., all possible views). Aspects presented herein may also utilize shading units that are large enough and roughly align with their screen-space size in order to minimize the effects of over-sampling and under-sampling.

In some instances, aspects of the present disclosure may define groups of pixels for shading by dividing a scene into meshlets and precomputing a number of view-independent charts. For example, aspects of the present disclosure may precompute a two-dimensional (2D) chart including a first axis (U) and a second axis (V) (i.e., a UV chart). A meshlet is a group of geometric primitives, which may or may not be connected. The meshlets may be generated to be relatively flat, so that no self-occlusion within the meshlet occurs in order to avoid artifacts. As indicated herein, each of the meshlets may include one or more primitives or triangles. Moreover, meshlets may be a convenient representation for modern rendering engines. For instance, mesh shaders may significantly increase the performance of modern render pipelines.

Aspects of the present disclosure may utilize or target meshlets with a maximum primitive/triangle count. Further, aspects of the present disclosure may use an existing shading atlas memory management in order to render the meshlets into the atlas. In some aspects, a fixed UV chart for each meshlet may be streamed once during initialization, and the UV chart may update the offsets in the atlas. Also, larger meshlets may result in fewer instances that need to be processed and streamed.

Additionally, aspects of the present disclosure may utilize a rendering process including a number of different stages. For example, aspects of the present disclosure may render utilizing a preprocessing stage, a visibility stage, a memory management stage, a shading stage, and/or a display stage. During a preprocessing stage, aspects of the present disclosure may generate meshlets and generate UV charts via applying a least-squares conformal mapping method. In a visibility stage, aspects of the present disclosure may determine which meshlets are visible and which meshlets are invisible. During a memory management stage, aspects of the present disclosure may allocate space in the atlas for each visible meshlet. In a shading stage, aspects of the present disclosure may shade each of the meshlets in the allocated atlas block. Lastly, during a display stage, aspects of the present disclosure may render the final view/image using the visible meshlets with the offset in the atlas and/or the precomputed UV chart. In order to display the final view/image, the view/image may be transmitted to a display or a display panel.

FIGS. 4A, 4B, and 4C illustrate diagrams 400, 420, and 440, respectively, of an example shaded three-dimensional (3D) model 402, an example meshlet visualization model 422, and an example meshlet 442. More specifically, diagrams 400, 420, and 440 in FIGS. 4A, 4B, and 4C illustrate different stages of a transformation process. As depicted in FIGS. 4A, 4B, and 4C, the transformation process includes shaded three-dimensional (3D) model 402, meshlet visualization model 422, and meshlet 442 in a shading atlas. As illustrated in FIG. 4A, diagram 400 includes shaded 3D model 402 including an identified area (i.e., the white box). This identified area corresponds to an area in a shading atlas including at least one meshlet (e.g., meshlet 442). As shown in FIG. 4B, diagram 420 includes meshlet visualization model 422 including an identified area (i.e., the white box). Similar to FIG. 4A, this identified area corresponds to an area in a shading atlas including at least one meshlet (e.g., meshlet 442). As depicted in FIG. 4C, diagram 440 includes meshlet 442 in a shading atlas, which corresponds to the identified areas in FIGS. 4A and 4B.

Aspects of the present disclosure may also utilize temporal coherence methods. For instance, since the UV charts are precomputed, changes in a projected size of a meshlet may lead to a scale adjustment of the mapping of the meshlet into the atlas. This process of scale adjustment may be similar to a process in a standard shading atlas. Also, this process may be combined with temporal reuse and caching to result in a higher efficiency (which may be similar to temporally adaptive shading). Further, streaming codecs may be able to exploit the temporal coherence similar to the standard shading atlas.

As indicated above, aspects of the present disclosure may utilize a memory management stage during the rendering process. In the memory management stage, the size of a meshlet may be determined in a manner similar to an original shading atlas. For example, the size of the meshlet may be determined based on the maximum angles between a meshlet center, a camera, and the vertices in the meshlet. This meshlet size determination may be performed to avoid issues of a perspective projection. In some aspects, the sides of a bounding box (e.g., a screen-space bounding box) may be enlarged to a certain power (e.g., the next power of two). Further, a block (e.g., an atlas-space block) of a corresponding size may be allocated in the shading atlas. Additionally, a bias (i.e., similar to a bias in the original shading atlas) may be applied to the bounding box size. This process may be used to limit the amount of shading workload.

Figures 5A, 5B:
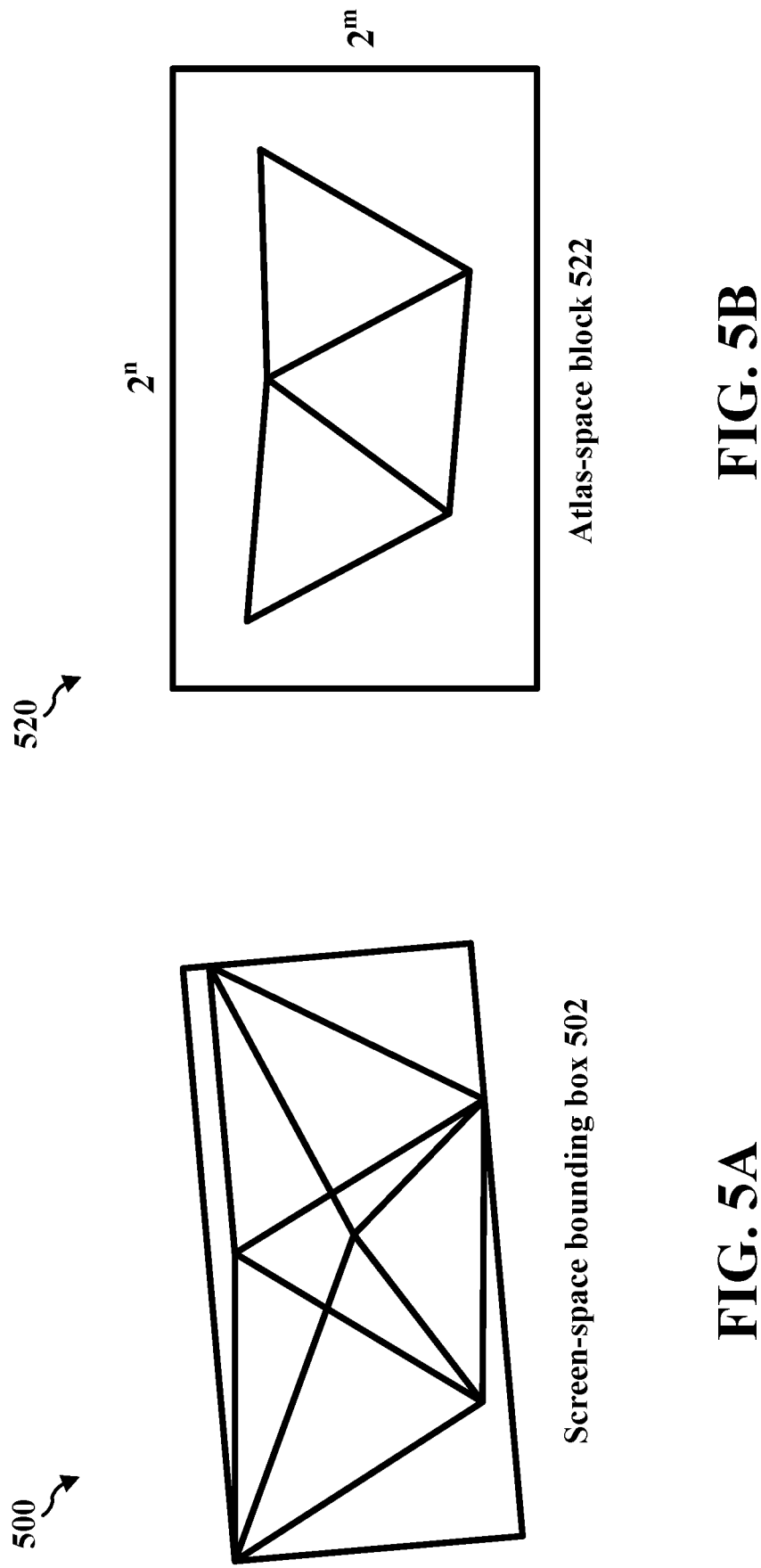
FIG. 5A is a diagram illustrating an example screen-space bounding box.
FIG. 5B is a diagram illustrating an example atlas-space block.

FIGS. 5A and 5B illustrate diagram 500 and 520, respectively, of an example screen-space bounding box and an example atlas-space block. As shown in FIG. 5A, diagram 500 includes screen-space bounding box 502. As mentioned herein, screen-space bounding box 502 may be utilized in a memory management stage during a rendering process. More specifically, during the memory management stage, a bias may be applied to the size of the bounding box. Also, the sides of screen-space bounding box 502 may be enlarged to a certain power (e.g., a power of 2). As shown in FIG. 5B, diagram 520 includes atlas-space block 522. As mentioned above, atlas-space block 522 may be allocated in a shading atlas. For instance, atlas-space block 522 may correspond to the size of screen-space bounding box 502 and be allocated in the shading atlas. Further, the length of the atlas-space block 522 may correspond to a certain amount (e.g., $2^m$) and the width of the atlas-space block 522 may correspond to another amount (e.g., $2^n$) where m and n are integer numbers.

Figure 6:
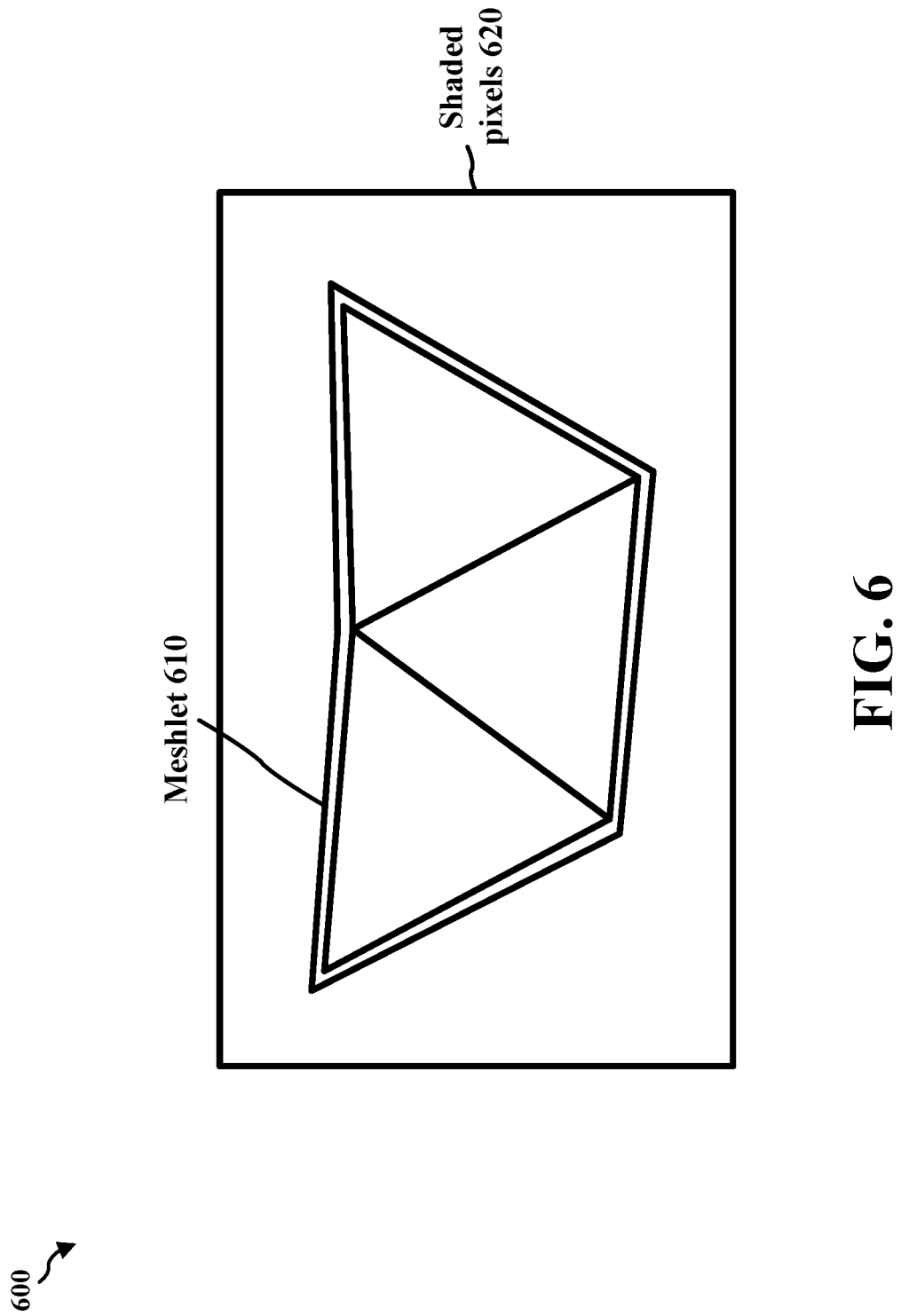
FIG. 6 is a diagram illustrating an example meshlet.

FIG. 6 illustrates diagram 600 of an example meshlet utilized during a shading stage. As shown in FIG. 6, diagram 600 includes meshlet 610 and shaded pixels 620. As mentioned above, aspects of the present disclosure may utilize a shading stage during the rendering process. During the shading stage, mesh shaders may be used to shade certain meshlets (e.g., visible meshlets) in the shading atlas (or meshlet atlas). As depicted in FIG. 6, a border of shaded pixels, e.g., shaded pixels 620, may be added around each of the shaded meshlets (e.g., meshlet 610). By adding the border of shaded pixels 620 around the meshlet 610, this may allow texture filtering when sampling from the atlas. A shading atlas may contain the shading information for the visible surfaces corresponding to rendered scenes. A meshlet atlas may contain the meshlet information for the visible surfaces corresponding to rendered scenes. Also, layout information may be information regarding an arrangement of elements within rendered scenes.

Aspects of the present disclosure may also utilize a display stage during the rendering process. In some instances, the display stage may be a straightforward render pass. For instance, texture coordinates may be computed in a vertex shader with precomputed UV charts (i.e., stored per vertex) and an offset into the atlas. Texture coordinates are coordinates in a texture space. Texture coordinates may be relative to a location in the texture space (e.g., (0,0)). Also, when a texture is applied to a primitive, its texel addresses may be mapped into object coordinates. The object coordinates may then be translated into screen coordinates or pixel locations. Additionally, the fragment shader may implement a texture lookup into the shading atlas with the texture coordinates from the vertex shader.

Aspects of the present disclosure may include a number of different benefits or advantages. As mentioned above, aspects of the present disclosure may provide a robust approach to texture space shading that utilizes certain shading approaches, such as meshlets and mesh shaders. Texture space shading solutions according to the present disclosure may be mostly independent of the texture resolution of original models. Further, texture space shading solutions may reduce sampling artifacts by employing view-independent precomputed UV charts. For instance, the view-independent precomputed UV charts may combine primitives/triangles, e.g., as many primitives/triangles as possible. Texture space shading solutions may also maintain efficient memory management, temporal coherence, potential streaming capabilities, and/or compactness of the shading atlas. Accordingly, aspects presented herein may provide a practical approach for modern engines that utilize texture-space caching and/or rendering. For example, aspects presented herein may be utilized with a number of processes, such as global illumination, temporal accumulation/caching/antialiasing, and baking.

Figure 7:
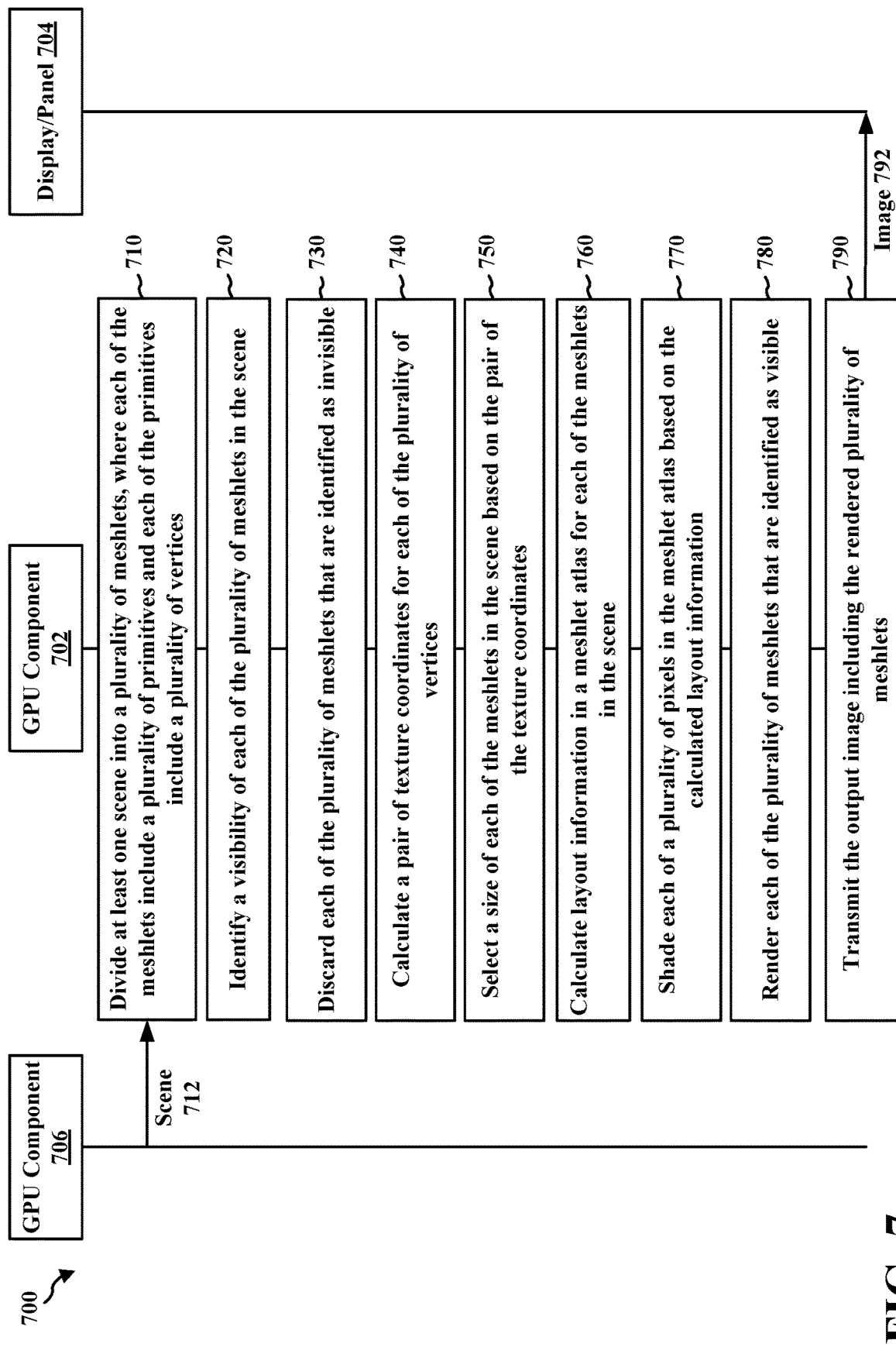
FIG. 7 is a communication flow diagram illustrating example communications between a GPU component and a display/panel.

FIG. 7 is a communication flow diagram 700 of graphics processing in accordance with one or more techniques of this disclosure. As shown in FIG. 7, diagram 700 includes example communications between a GPU component 702 (e.g., a component in a GPU pipeline), a display or panel 704, and a GPU component 706 (e.g., a component in a GPU pipeline) in accordance with one or more techniques of this disclosure.

At 710, GPU component 702 may divide at least one scene into a plurality of meshlets, each of the plurality of meshlets including a plurality of primitives, and each of the plurality of primitives including plurality of vertices. In some aspects, GPU component 702 may receive an indication of the at least one scene (e.g., GPU component 702 may receive an indication of at least one scene 712 from GPU component 706). In some aspects, each of the plurality of primitives in each of the plurality of meshlets may be adjacent to at least one other primitive of the plurality of primitives, within a threshold distance of the at least one other primitive, or spatially coherent with the at least one other primitive.

At 720, GPU component 702 may identify a visibility of each of the plurality of meshlets in the at least one scene, where each of the plurality of meshlets is identified as visible or invisible. In some instances, each of the plurality of meshlets that are identified as visible may correspond to at least one of the shaded plurality of pixels in the meshlet atlas.

At 730, GPU component 702 may discard each of the plurality of meshlets that are identified as invisible.

At 740, GPU component 702 may calculate a pair of texture coordinates for each of the plurality of vertices of each of the plurality of primitives in each of the plurality of meshlets. The pair of the texture coordinates for each of the plurality of vertices in each of the plurality of meshlets may be precomputed based on a minimally distorted arrangement of the meshlet. Also, the pair of the texture coordinates for each of the plurality of vertices in each of the plurality of meshlets may be dynamically computed based on the perspective projection of the meshlet. Further, the pair of the texture coordinates for each of the plurality of vertices in each of the plurality of meshlets may be calculated in a mesh shader, a vertex shader, or a compute shade.

At 750, GPU component 702 may select a size of each of the plurality of meshlets in the at least one scene based on the pair of the texture coordinates for each the plurality of vertices of each of the plurality of primitives in each of the plurality of meshlets and based on a perspective projection of each of the plurality of meshlets. The perspective projection of each of the plurality of meshlets may be a projection of each meshlet to an image plane corresponding to a current point-of-view of the at least one scene. Also, the size of each of the plurality of meshlets may be based on a maximum of a subtended angle between a center of each of the plurality of meshlets and each of the plurality of vertices of the meshlet, where the subtended angle corresponds to a current a point-of-view of the at least one scene.

At 760, GPU component 702 may calculate layout information in a meshlet atlas for each of the plurality of meshlets in the at least one scene, the layout information in the meshlet atlas for each meshlet being based on the selected size of the meshlet. In some aspects, calculating the layout information in the meshlet atlas may include allocating space in the meshlet atlas for each of the plurality of meshlets in the at least one scene, where the allocated space in a shading atlas for each of the plurality of meshlets is based on the selected size of the meshlet. The meshlet atlas may correspond to an object space shading representation. Moreover, the meshlet atlas may be associated with a graphics application including at least one of: a streaming application, a global illumination application, a temporal accumulation application, a caching application, or an antialiasing application.

At 770, GPU component 702 may shade each of a plurality of pixels in the meshlet atlas based on the calculated layout information in the meshlet atlas. In some instances, shading each of the plurality of pixels in the meshlet atlas may include computing a surface color of each of the plurality of pixels in the meshlet atlas. For example, the GPU component may compute a surface color of each of the plurality of pixels in the meshlet atlas. Additionally, shading each of the plurality of pixels in the meshlet atlas may include computing at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas.

For example, the GPU component may compute at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas.

At 780, GPU component 702 may render each of the plurality of meshlets that are identified as visible, where the meshlet atlas is sampled to determine a color of each of the plurality of pixels in an output image.

At 790, GPU component 702 may transmit, to a display or a panel (e.g., display/panel 704), the output image including the rendered plurality of meshlets that are identified as visible (e.g., GPU component 702 may transmit image 792 to display/panel 704).

Figure 8:
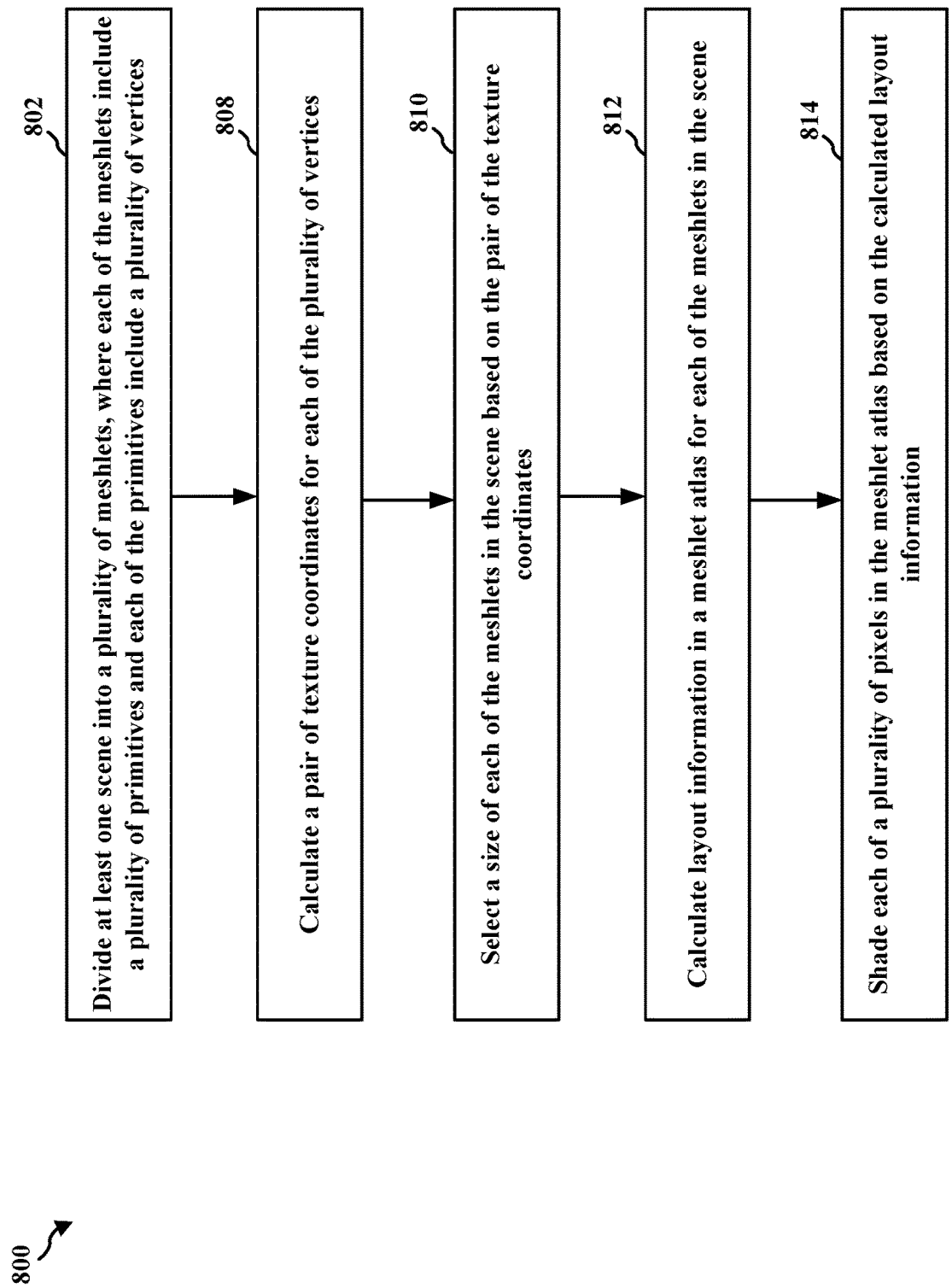
FIG. 8 is a flowchart of an example method of graphics processing.

FIG. 8 is a flowchart 800 of an example method of graphics processing in accordance with one or more techniques of this disclosure. The method may be performed by a GPU, such as an apparatus for graphics processing, another graphics processor, a GPU pipeline, a wireless communication device, and/or any apparatus that may perform graphics processing as used in connection with the examples of FIGS. 1-7.

At 802, the GPU may divide at least one scene into a plurality of meshlets, each of the plurality of meshlets including a plurality of primitives, and each of the plurality of primitives including plurality of vertices, as described in connection with the examples in FIGS. 1-7. For example, as described in 710 of FIG. 7, GPU component 702 may divide at least one scene into a plurality of meshlets, each of the plurality of meshlets including a plurality of primitives, and each of the plurality of primitives including plurality of vertices. Further, step 802 may be performed by processing unit 120 in FIG. 1. In some aspects, each of the plurality of primitives in each of the plurality of meshlets may be adjacent to at least one other primitive of the plurality of primitives, within a threshold distance of the at least one other primitive, or spatially coherent with the at least one other primitive. In some aspects, the GPU may receive an indication of the at least one scene (e.g., the GPU may receive an indication of the at least one scene from another GPU component).

At 808, the GPU may calculate a pair of texture coordinates for each of the plurality of vertices of each of the plurality of primitives in each of the plurality of meshlets, as described in connection with the examples in FIGS. 1-7. For example, as described in 740 of FIG. 7, GPU component 702 may calculate a pair of texture coordinates for each of the plurality of vertices of each of the plurality of primitives in each of the plurality of meshlets. Further, step 808 may be performed by processing unit 120 in FIG. 1. The pair of the texture coordinates for each of the plurality of vertices in each of the plurality of meshlets may be precomputed based on a minimally distorted arrangement of the meshlet. Also, the pair of the texture coordinates for each of the plurality of vertices in each of the plurality of meshlets may be dynamically computed based on the perspective projection of the meshlet. Further, the pair of the texture coordinates for each of the plurality of vertices in each of the plurality of meshlets may be calculated in a mesh shader, a vertex shader, or a compute shade.

At 810, the GPU may select a size of each of the plurality of meshlets in the at least one scene based on the pair of the texture coordinates for each the plurality of vertices of each of the plurality of primitives in each of the plurality of meshlets and based on a perspective projection of each of the plurality of meshlets, as described in connection with the examples in FIGS. 1-7. For example, as described in 750 of FIG. 7, GPU component 702 may select a size of each of the plurality of meshlets in the at least one scene based on the pair of the texture coordinates for each the plurality of vertices of each of the plurality of primitives in each of the plurality of meshlets and based on a perspective projection of each of the plurality of meshlets. Further, step 810 may be performed by processing unit 120 in FIG. 1. The perspective projection of each of the plurality of meshlets may be a projection of each meshlet to an image plane corresponding to a current point-of-view of the at least one scene. Also, the size of each of the plurality of meshlets may be based on a maximum of a subtended angle between a center of each of the plurality of meshlets and each of the plurality of vertices of the meshlet, where the subtended angle corresponds to a current a point-of-view of the at least one scene.

At 812, the GPU may calculate layout information in a meshlet atlas for each of the plurality of meshlets in the at least one scene, the layout information in the meshlet atlas for each meshlet being based on the selected size of the meshlet, as described in connection with the examples in FIGS. 1-7. For example, as described in 760 of FIG. 7, GPU component 702 may calculate layout information in a meshlet atlas for each of the plurality of meshlets in the at least one scene, the layout information in the meshlet atlas for each meshlet being based on the selected size of the meshlet. Further, step 812 may be performed by processing unit 120 in FIG. 1. In some aspects, calculating the layout information in the meshlet atlas may include allocating space in the meshlet atlas for each of the plurality of meshlets in the at least one scene, where the allocated space in a shading atlas for each of the plurality of meshlets is based on the selected size of the meshlet. The meshlet atlas may correspond to an object space shading representation. Moreover, the meshlet atlas may be associated with a graphics application including at least one of: a streaming application, a global illumination application, a temporal accumulation application, a caching application, or an antialiasing application.

At 814, the GPU may shade each of a plurality of pixels in the meshlet atlas based on the calculated layout information in the meshlet atlas, as described in connection with the examples in FIGS. 1-7. For example, as described in 770 of FIG. 7, GPU component 702 may shade each of a plurality of pixels in the meshlet atlas based on the calculated layout information in the meshlet atlas. Further, step 814 may be performed by processing unit 120 in FIG. 1. In some instances, shading each of the plurality of pixels in the meshlet atlas may include computing a surface color of each of the plurality of pixels in the meshlet atlas. For example, the GPU may compute a surface color of each of the plurality of pixels in the meshlet atlas. Additionally, shading each of the plurality of pixels in the meshlet atlas may include computing at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas. For example, the GPU may compute at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas.

Figure 9:
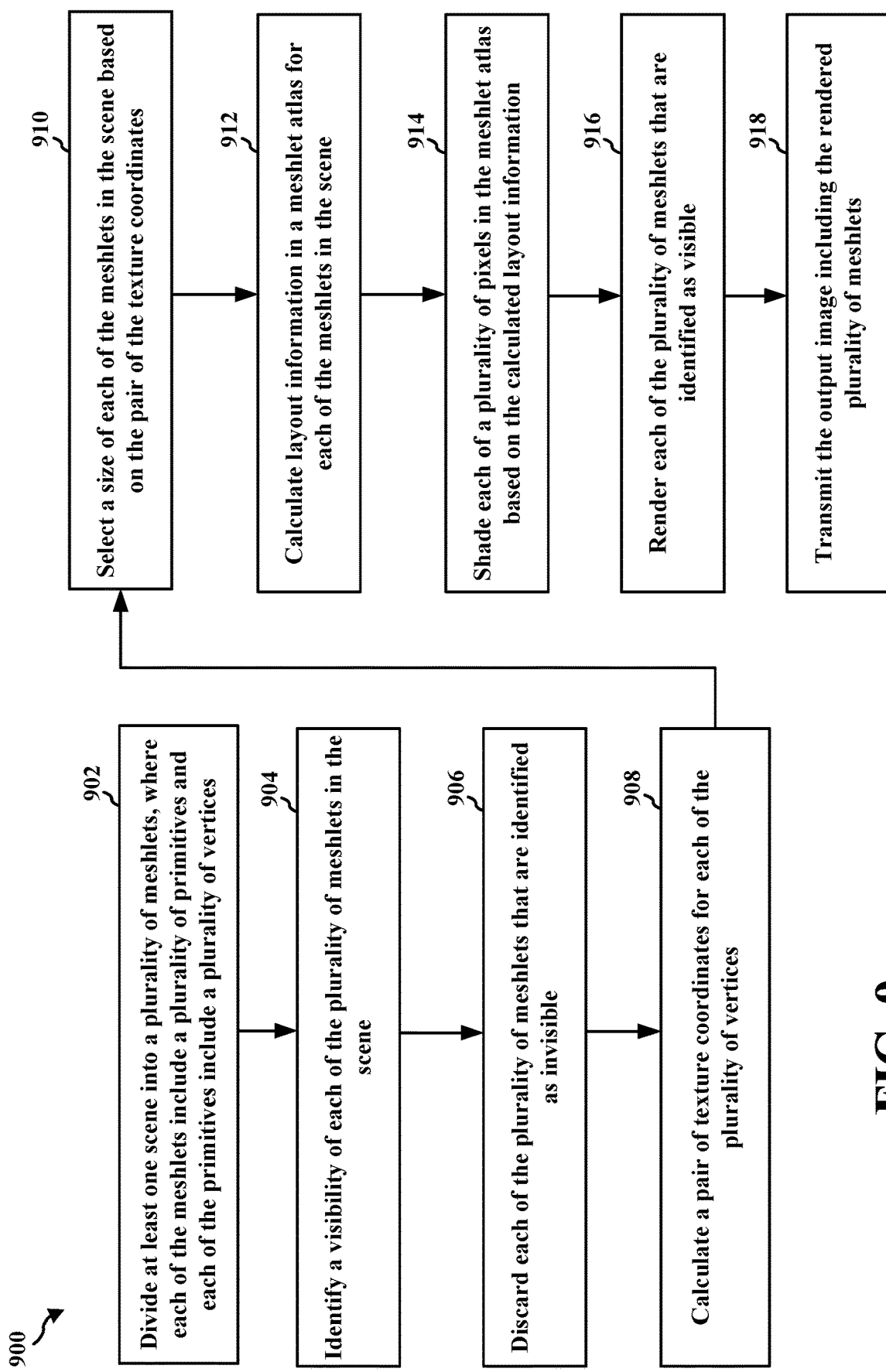
FIG. 9 is a flowchart of an example method of graphics processing.

FIG. 9 is a flowchart 900 of an example method of graphics processing in accordance with one or more techniques of this disclosure. The method may be performed by a GPU, such as an apparatus for graphics processing, another graphics processor, a GPU pipeline, a wireless communication device, and/or any apparatus that may perform graphics processing as used in connection with the examples of FIGS. 1-7.

At 902, the GPU may divide at least one scene into a plurality of meshlets, each of the plurality of meshlets including a plurality of primitives, and each of the plurality of primitives including plurality of vertices, as described in connection with the examples in FIGS. 1-7. For example, as described in 710 of FIG. 7, GPU component 702 may divide at least one scene into a plurality of meshlets, each of the plurality of meshlets including a plurality of primitives, and each of the plurality of primitives including plurality of vertices. Further, step 902 may be performed by processing unit 120 in FIG. 1. In some aspects, each of the plurality of primitives in each of the plurality of meshlets may be adjacent to at least one other primitive of the plurality of primitives, within a threshold distance of the at least one other primitive, or spatially coherent with the at least one other primitive. In some aspects, the GPU may receive an indication of the at least one scene (e.g., the GPU may receive an indication of the at least one scene from another GPU component).

At 904, the GPU may identify a visibility of each of the plurality of meshlets in the at least one scene, where each of the plurality of meshlets is identified as visible or invisible, as described in connection with the examples in FIGS. 1-7. For example, as described in 720 of FIG. 7, GPU component 702 may identify a visibility of each of the plurality of meshlets in the at least one scene, where each of the plurality of meshlets is identified as visible or invisible. Further, step 904 may be performed by processing unit 120 in FIG. 1. In some instances, each of the plurality of meshlets that are identified as visible may correspond to at least one of the shaded plurality of pixels in the meshlet atlas.

At 906, the GPU may discard each of the plurality of meshlets that are identified as invisible, as described in connection with the examples in FIGS. 1-7. For example, as described in 730 of FIG. 7, GPU component 702 may discard each of the plurality of meshlets that are identified as invisible. Further, step 906 may be performed by processing unit 120 in FIG. 1.

At 908, the GPU may calculate a pair of texture coordinates for each of the plurality of vertices of each of the plurality of primitives in each of the plurality of meshlets, as described in connection with the examples in FIGS. 1-7. For example, as described in 740 of FIG. 7, GPU component 702 may calculate a pair of texture coordinates for each of the plurality of vertices of each of the plurality of primitives in each of the plurality of meshlets. Further, step 908 may be performed by processing unit 120 in FIG. 1. The pair of the texture coordinates for each of the plurality of vertices in each of the plurality of meshlets may be precomputed based on a minimally distorted arrangement of the meshlet. Also, the pair of the texture coordinates for each of the plurality of vertices in each of the plurality of meshlets may be dynamically computed based on the perspective projection of the meshlet. Further, the pair of the texture coordinates for each of the plurality of vertices in each of the plurality of meshlets may be calculated in a mesh shader, a vertex shader, or a compute shade.

At 910, the GPU may select a size of each of the plurality of meshlets in the at least one scene based on the pair of the texture coordinates for each the plurality of vertices of each of the plurality of primitives in each of the plurality of meshlets and based on a perspective projection of each of the plurality of meshlets, as described in connection with the examples in FIGS. 1-7. For example, as described in 750 of FIG. 7, GPU component 702 may select a size of each of the plurality of meshlets in the at least one scene based on the pair of the texture coordinates for each the plurality of vertices of each of the plurality of primitives in each of the plurality of meshlets and based on a perspective projection of each of the plurality of meshlets. Further, step 910 may be performed by processing unit 120 in FIG. 1. The perspective projection of each of the plurality of meshlets may be a projection of each meshlet to an image plane corresponding to a current point-of-view of the at least one scene. Also, the size of each of the plurality of meshlets may be based on a maximum of a subtended angle between a center of each of the plurality of meshlets and each of the plurality of vertices of the meshlet, where the subtended angle corresponds to a current a point-of-view of the at least one scene.

At 912, the GPU may calculate layout information in a meshlet atlas for each of the plurality of meshlets in the at least one scene, the layout information in the meshlet atlas for each meshlet being based on the selected size of the meshlet, as described in connection with the examples in FIGS. 1-7. For example, as described in 760 of FIG. 7, GPU component 702 may calculate layout information in a meshlet atlas for each of the plurality of meshlets in the at least one scene, the layout information in the meshlet atlas for each meshlet being based on the selected size of the meshlet. Further, step 912 may be performed by processing unit 120 in FIG. 1. In some aspects, calculating the layout information in the meshlet atlas may include allocating space in the meshlet atlas for each of the plurality of meshlets in the at least one scene, where the allocated space in a shading atlas for each of the plurality of meshlets is based on the selected size of the meshlet. The meshlet atlas may correspond to an object space shading representation. Moreover, the meshlet atlas may be associated with a graphics application including at least one of: a streaming application, a global illumination application, a temporal accumulation application, a caching application, or an antialiasing application.

At 914, the GPU may shade each of a plurality of pixels in the meshlet atlas based on the calculated layout information in the meshlet atlas, as described in connection with the examples in FIGS. 1-7. For example, as described in 770 of FIG. 7, GPU component 702 may shade each of a plurality of pixels in the meshlet atlas based on the calculated layout information in the meshlet atlas. Further, step 914 may be performed by processing unit 120 in FIG. 1. In some instances, shading each of the plurality of pixels in the meshlet atlas may include computing a surface color of each of the plurality of pixels in the meshlet atlas. For example, the GPU may compute a surface color of each of the plurality of pixels in the meshlet atlas. Additionally, shading each of the plurality of pixels in the meshlet atlas may include computing at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas. For example, the GPU may compute at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas.

At 916, the GPU may render each of the plurality of meshlets that are identified as visible, where the meshlet atlas is sampled to determine a color of each of the plurality of pixels in an output image, as described in connection with the examples in FIGS. 1-7. For example, as described in 780 of FIG. 7, GPU component 702 may render each of the plurality of meshlets that are identified as visible, where the meshlet atlas is sampled to determine a color of each of the plurality of pixels in an output image. Further, step 916 may be performed by processing unit 120 in FIG. 1.

At 918, the GPU may transmit, to a display or a panel, the output image including the rendered plurality of meshlets that are identified as visible, as described in connection with the examples in FIGS. 1-7. For example, as described in 790 of FIG. 7, GPU component 702 may transmit, to a display or a panel, the output image including the rendered plurality of meshlets that are identified as visible. Further, step 918 may be performed by processing unit 120 in FIG. 1.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for dividing at least one scene into a plurality of meshlets, each of the plurality of meshlets including a plurality of primitives, and each of the plurality of primitives including plurality of vertices. The apparatus, e.g., processing unit 120, may also include means for calculating a pair of texture coordinates for each of the plurality of vertices of each of the plurality of primitives in each of the plurality of meshlets. The apparatus, e.g., processing unit 120, may also include means for selecting a size of each of the plurality of meshlets in the at least one scene based on the pair of the texture coordinates for each the plurality of vertices of each of the plurality of primitives in each of the plurality of meshlets and based on a perspective projection of each of the plurality of meshlets. The apparatus, e.g., processing unit 120, may also include means for calculating layout information in a meshlet atlas for each of the plurality of meshlets in the at least one scene, the layout information in the meshlet atlas for each meshlet being based on the selected size of the meshlet. The apparatus, e.g., processing unit 120, may also include means for shading each of a plurality of pixels in the meshlet atlas based on the calculated layout information in the meshlet atlas. The apparatus, e.g., processing unit 120, may also include means for identifying a visibility of each of the plurality of meshlets in the at least one scene, where each of the plurality of meshlets is identified as visible or invisible. The apparatus, e.g., processing unit 120, may also include means for discarding each of the plurality of meshlets that are identified as invisible. The apparatus, e.g., processing unit 120, may also include means for rendering each of the plurality of meshlets that are identified as visible, where the meshlet atlas is sampled to determine a color of each of the plurality of pixels in an output image. The apparatus, e.g., processing unit 120, may also include means for transmitting, to a display or a panel, the output image including the rendered plurality of meshlets that are identified as visible.

The subject matter described herein may be implemented to realize one or more benefits or advantages. For instance, the described graphics processing techniques may be used by a GPU, a graphics processor, or some other processor that may perform graphics processing to implement the meshlet shading atlas techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize meshlet shading atlas techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and, based at least in part on first information stored in the memory, the at least one processor is configured to: divide at least one scene into a plurality of meshlets, each of the plurality of meshlets including a plurality of primitives, and each of the plurality of primitives including plurality of vertices; calculate a pair of texture coordinates for each of the plurality of vertices of each of the plurality of primitives in each of the plurality of meshlets; select a size of each of the plurality of meshlets in the at least one scene based on the pair of the texture coordinates for each the plurality of vertices of each of the plurality of primitives in each of the plurality of meshlets and based on a perspective projection of each of the plurality of meshlets; calculate layout information in a meshlet atlas for each of the plurality of meshlets in the at least one scene, the layout information in the meshlet atlas for each meshlet being based on the selected size of the meshlet; and shade each of a plurality of pixels in the meshlet atlas based on the calculated layout information in the meshlet atlas.

Aspect 2 is the apparatus of aspect 1, where the at least one processor is further configured to: identify a visibility of each of the plurality of meshlets in the at least one scene, where each of the plurality of meshlets is identified as visible or invisible.

Aspect 3 is the apparatus of aspect 2, where the at least one processor is further configured to: discard each of the plurality of meshlets that are identified as invisible.

Aspect 4 is the apparatus of aspect 2, where each of the plurality of meshlets that are identified as visible correspond to at least one of the shaded plurality of pixels in the meshlet atlas.

Aspect 5 is the apparatus of any of aspects 1 to 4, where the perspective projection of each of the plurality of meshlets is a projection of each meshlet to an image plane corresponding to a current point-of-view of the at least one scene.

Aspect 6 is the apparatus of any of aspects 1 to 5, where the size of each of the plurality of meshlets is based on a maximum of a subtended angle between a center of each of the plurality of meshlets and each of the plurality of vertices of the meshlet, where the subtended angle corresponds to a current a point-of-view of the at least one scene.

Aspect 7 is the apparatus of any of aspects 1 to 6, where to calculate the layout information in the meshlet atlas, the at least one processor is configured to: allocate space in the meshlet atlas for each of the plurality of meshlets in the at least one scene, where the allocated space in a shading atlas for each of the plurality of meshlets is based on the selected size of the meshlet.

Aspect 8 is the apparatus of any of aspects 1 to 7, where to shade each of the plurality of pixels in the meshlet atlas, the at least one processor is configured to: compute a surface color of each of the plurality of pixels in the meshlet atlas.

Aspect 9 is the apparatus of any of aspects 1 to 8, where to shade each of the plurality of pixels in the meshlet atlas, the at least one processor is configured to: compute at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas.

Aspect 10 is the apparatus of any of aspects 1 to 9, where the at least one processor is further configured to: render each of the plurality of meshlets that are identified as visible, where the meshlet atlas is sampled to determine a color of each of the plurality of pixels in an output image.

Aspect 11 is the apparatus of aspect 10, where the at least one processor is further configured to: transmit, to a display or a panel, the output image including the rendered plurality of meshlets that are identified as visible.

Aspect 12 is the apparatus of any of aspects 1 to 11, where each of the plurality of primitives in each of the plurality of meshlets are adjacent to at least one other primitive of the plurality of primitives, within a threshold distance of the at least one other primitive, or spatially coherent with the at least one other primitive.

Aspect 13 is the apparatus of any of aspects 1 to 12, where the pair of the texture coordinates for each of the plurality of vertices in each of the plurality of meshlets is precomputed based on a minimally distorted arrangement of the meshlet.

Aspect 14 is the apparatus of any of aspects 1 to 13, where the pair of the texture coordinates for each of the plurality of vertices in each of the plurality of meshlets is dynamically computed based on the perspective projection of the meshlet.

Aspect 15 is the apparatus of any of aspects 1 to 14, where the pair of the texture coordinates for each of the plurality of vertices in each of the plurality of meshlets is calculated in a mesh shader, a vertex shader, or a compute shader.

Aspect 16 is the apparatus of any of aspects 1 to 15, where the meshlet atlas corresponds to an object space shading representation.

Aspect 17 is the apparatus of any of aspects 1 to 16, where the meshlet atlas is associated with a graphics application including at least one of: a streaming application, a global illumination application, a temporal accumulation application, a caching application, or an antialiasing application.

Aspect 18 is the apparatus of any of aspects 1 to 17, where the apparatus is a wireless communication device, further including at least one of an antenna or a transceiver coupled to the at least one processor, where the at least one processor is configured to receive an indication of the scene via at least one of the antenna or the transceiver.

Aspect 19 is a method of graphics processing for implementing any of aspects 1 to 17.

Aspect 20 is an apparatus for graphics processing including means for implementing any of aspects 1 to 18.

Aspect 21 is a computer-readable medium (e.g., non-transitory a computer-readable medium) storing computer executable code, the code when executed by a processor causes the at least one processor to implement any of aspects 1 to 17.

What is claimed is:

1. An apparatus for graphics processing, comprising:
   memory; and
   at least one processor coupled to the memory and, based at least in part on first information stored in the memory, the at least one processor is configured to:
     divide at least one scene into a plurality of meshlets, each of the plurality of meshlets including a plurality of primitives, and each of the plurality of primitives including plurality of vertices;
     identify a visibility of each of the plurality of meshlets in the at least one scene, wherein each of the plurality of meshlets is identified as visible or invisible, wherein each of the plurality of meshlets that are identified as visible corresponds to at least one of a plurality of pixels in a meshlet atlas;
     calculate a pair of texture coordinates for each of the plurality of vertices of each of the plurality of primitives in each of the plurality of meshlets;
     select a size of each of the plurality of meshlets in the at least one scene based on the pair of the texture coordinates for each the plurality of vertices of each of the plurality of primitives in each of the plurality of meshlets and based on a perspective projection of each of the plurality of meshlets;
     calculate layout information in the meshlet atlas for each of the plurality of meshlets in the at least one scene, the layout information in the meshlet atlas for each meshlet being based on the selected size of the meshlet; and
     shade each of the plurality of pixels in the meshlet atlas based on the calculated layout information in the meshlet atlas.

2. The apparatus of claim 1, wherein the at least one processor is further configured to:
   discard each of the plurality of meshlets that are identified as invisible.

3. The apparatus of claim 1, wherein the perspective projection of each of the plurality of meshlets is a projection of each meshlet to an image plane corresponding to a current point-of-view of the at least one scene.

4. The apparatus of claim 1, wherein the size of each of the plurality of meshlets is based on a maximum of a subtended angle between a center of each of the plurality of meshlets and each of the plurality of vertices of the meshlet, wherein the subtended angle corresponds to a current a point-of-view of the at least one scene.

5. The apparatus of claim 1, wherein to calculate the layout information in the meshlet atlas, the at least one processor is configured to: allocate space in the meshlet atlas for each of the plurality of meshlets in the at least one scene, wherein the allocated space in a shading atlas for each of the plurality of meshlets is based on the selected size of the meshlet.

6. The apparatus of claim 1, wherein to shade each of the plurality of pixels in the meshlet atlas, the at least one processor is configured to: compute a surface color of each of the plurality of pixels in the meshlet atlas.

7. The apparatus of claim 1, wherein to shade each of the plurality of pixels in the meshlet atlas, the at least one processor is configured to: compute at least one of transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas.

8. The apparatus of claim 1, wherein the at least one processor is further configured to:
   render each of the plurality of meshlets that are identified as visible, wherein the meshlet atlas is sampled to determine a color of each of the plurality of pixels in an output image.

9. The apparatus of claim 8, wherein the at least one processor is further configured to:

transmit, to a display or a panel, the output image including the rendered plurality of meshlets that are identified as visible.

10. The apparatus of claim 1, wherein each of the plurality of primitives in each of the plurality of meshlets are adjacent to at least one other primitive of the plurality of primitives, within a threshold distance of the at least one other primitive, or spatially coherent with the at least one other primitive.

11. The apparatus of claim 1, wherein the pair of the texture coordinates for each of the plurality of vertices in each of the plurality of meshlets is precomputed based on a minimally distorted arrangement of the meshlet.

12. The apparatus of claim 1, wherein the pair of the texture coordinates for each of the plurality of vertices in each of the plurality of meshlets is dynamically computed based on the perspective projection of the meshlet.

13. The apparatus of claim 1, wherein to calculate the pair of the texture coordinates for each of the plurality of vertices in each of the plurality of meshlets, the at least one processor is configured to calculate the pair of the texture coordinates for each of the plurality of vertices in each of the plurality of meshlets in a mesh shader, a vertex shader, or a compute shader.

14. The apparatus of claim 1, wherein the meshlet atlas corresponds to an object space shading representation.

15. The apparatus of claim 1, further comprising at least one of an antenna or a transceiver coupled to the at least one processor, wherein the at least one processor is configured to receive an indication of the scene via at least one of the antenna or the transceiver, and wherein the meshlet atlas is associated with a graphics application including at least one of: a streaming application, a global illumination application, a temporal accumulation application, a caching application, or an antialiasing application.

16. A method of graphics processing, comprising:
dividing at least one scene into a plurality of meshlets, each of the plurality of meshlets including a plurality of primitives, and each of the plurality of primitives including plurality of vertices;
identifying a visibility of each of the plurality of meshlets in the at least one scene, wherein each of the plurality of meshlets is identified as visible or invisible, wherein each of the plurality of meshlets that are identified as visible corresponds to at least one of a plurality of pixels in a meshlet atlas;
calculating a pair of texture coordinates for each of the plurality of vertices of each of the plurality of primitives in each of the plurality of meshlets;
selecting a size of each of the plurality of meshlets in the at least one scene based on the pair of the texture coordinates for each the plurality of vertices of each of the plurality of primitives in each of the plurality of meshlets and based on a perspective projection of each of the plurality of meshlets;
calculating layout information in the meshlet atlas for each of the plurality of meshlets in the at least one scene, the layout information in the meshlet atlas for each meshlet being based on the selected size of the meshlet; and
shading each of the plurality of pixels in the meshlet atlas based on the calculated layout information in the meshlet atlas.

17. The method of claim 16, further comprising:
discarding each of the plurality of meshlets that are identified as invisible.

18. The method of claim 16, wherein the perspective projection of each of the plurality of meshlets is a projection of each meshlet to an image plane corresponding to a current point-of-view of the at least one scene.

19. The method of claim 16, wherein the size of each of the plurality of meshlets is based on a maximum of a subtended angle between a center of each of the plurality of meshlets and each of the plurality of vertices of the meshlet, wherein the subtended angle corresponds to a current a point-of-view of the at least one scene.

20. The method of claim 16, wherein calculating the layout information in the meshlet atlas comprises: allocating space in the meshlet atlas for each of the plurality of meshlets in the at least one scene, wherein the allocated space in a shading atlas for each of the plurality of meshlets is based on the selected size of the meshlet.

21. The method of claim 16, wherein shading each of the plurality of pixels in the meshlet atlas comprises: computing a surface color of each of the plurality of pixels in the meshlet atlas, or wherein shading each of the plurality of pixels in the meshlet atlas comprises: computing at least one of: transparency information of each of the plurality of pixels in the meshlet atlas, an object identifier of each of the plurality of pixels in the meshlet atlas, one or more surface normals of each of the plurality of pixels in the meshlet atlas, or a world space position of each of the plurality of pixels in the meshlet atlas.

22. The method of claim 16, further comprising:
rendering each of the plurality of meshlets that are identified as visible, wherein the meshlet atlas is sampled to determine a color of each of the plurality of pixels in an output image; and
transmitting, to a display or a panel, the output image including the rendered plurality of meshlets that are identified as visible.

23. The method of claim 16, wherein each of the plurality of primitives in each of the plurality of meshlets are adjacent to at least one other primitive of the plurality of primitives, within a threshold distance of the at least one other primitive, or spatially coherent with the at least one other primitive, and wherein the pair of the texture coordinates for each of the plurality of vertices in each of the plurality of meshlets is precomputed based on a minimally distorted arrangement of the meshlet.

24. The method of claim 16, wherein the pair of the texture coordinates for each of the plurality of vertices in each of the plurality of meshlets is dynamically computed based on the perspective projection of the meshlet, wherein the pair of the texture coordinates for each of the plurality of vertices in each of the plurality of meshlets is calculated in a mesh shader, a vertex shader, or a compute shader, wherein the meshlet atlas corresponds to an object space shading representation, and wherein the meshlet atlas is associated with a graphics application including at least one of: a streaming application, a global illumination application, a temporal accumulation application, a caching application, or an antialiasing application.

25. An apparatus for graphics processing, comprising:
means for dividing at least one scene into a plurality of meshlets, each of the plurality of meshlets including a plurality of primitives, and each of the plurality of primitives including plurality of vertices;
means for identifying a visibility of each of the plurality of meshlets in the at least one scene, wherein each of the plurality of meshlets is identified as visible or invisible, wherein each of the plurality of meshlets that are identified as visible corresponds to at least one of a plurality of pixels in a meshlet atlas;

means for calculating a pair of texture coordinates for each of the plurality of vertices of each of the plurality of primitives in each of the plurality of meshlets;

means for selecting a size of each of the plurality of meshlets in the at least one scene based on the pair of the texture coordinates for each the plurality of vertices of each of the plurality of primitives in each of the plurality of meshlets and based on a perspective projection of each of the plurality of meshlets;

means for calculating layout information in the meshlet atlas for each of the plurality of meshlets in the at least one scene, the layout information in the meshlet atlas for each meshlet being based on the selected size of the meshlet; and means for shading each of the plurality of pixels in the meshlet atlas based on the calculated layout information in the meshlet atlas.

26. A non-transitory computer-readable medium storing computer executable code for graphics processing, the code when executed by a processor causes the processor to:

divide at least one scene into a plurality of meshlets, each of the plurality of meshlets including a plurality of primitives, and each of the plurality of primitives including plurality of vertices;

identify a visibility of each of the plurality of meshlets in the at least one scene, wherein each of the plurality of meshlets is identified as visible or invisible, wherein each of the plurality of meshlets that are identified as visible corresponds to at least one of a plurality of pixels in a meshlet atlas;

calculate a pair of texture coordinates for each of the plurality of vertices of each of the plurality of primitives in each of the plurality of meshlets;

select a size of each of the plurality of meshlets in the at least one scene based on the pair of the texture coordinates for each the plurality of vertices of each of the plurality of primitives in each of the plurality of meshlets and based on a perspective projection of each of the plurality of meshlets;

calculate layout information in the meshlet atlas for each of the plurality of meshlets in the at least one scene, the layout information in the meshlet atlas for each meshlet being based on the selected size of the meshlet; and shade each of the plurality of pixels in the meshlet atlas based on the calculated layout information in the meshlet atlas.

* * * * *